(No Model.)　　　　　　　　　　　　　　　　　2 Sheets—Sheet 1.
E. E. BARCLAY.
SEED DRILL.
No. 466,762.　　　　　　　　　Patented Jan. 12, 1892.
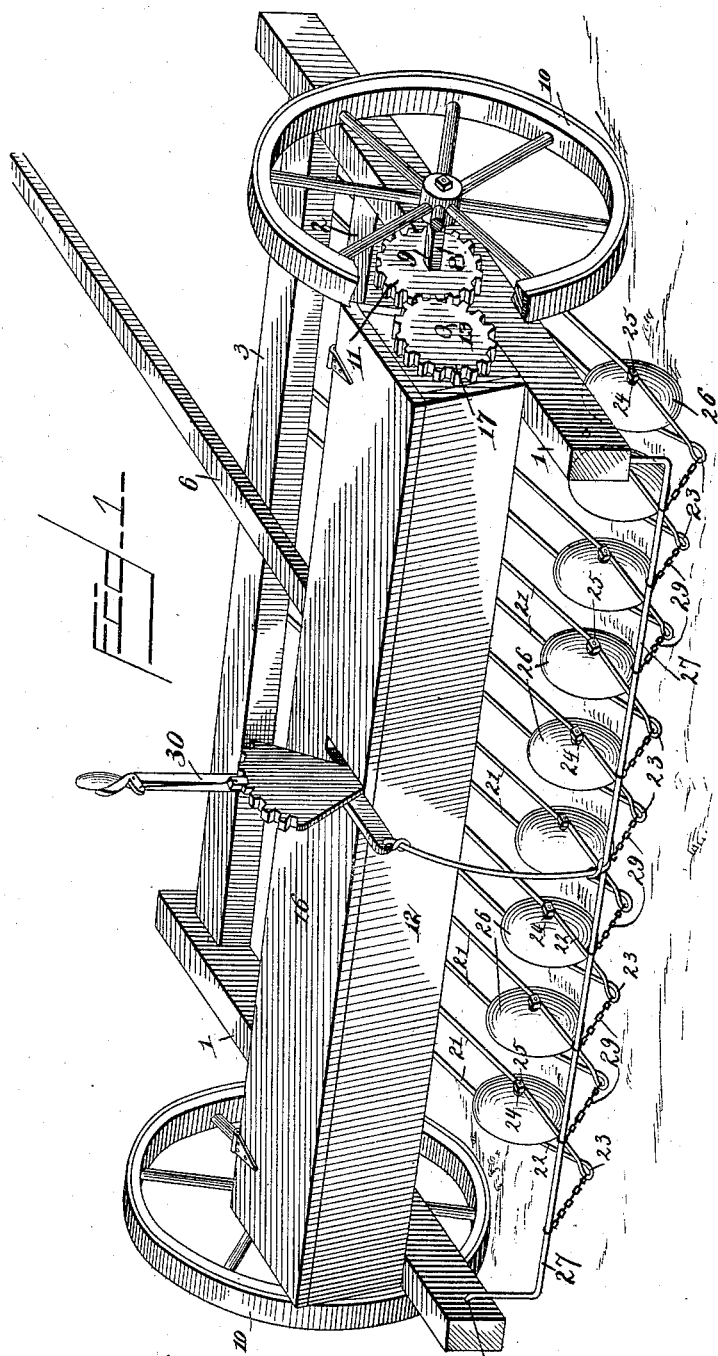
Witnesses　　　　　　　　　　　　　　　　Inventor
H. G. Dieterich　　　　　　　　　　　Elmer E. Barclay
　　　　　　　By his Attorneys,
　　　　　　　　　C. A. Snow & Co.

(No Model.) 2 Sheets—Sheet 2.
E. E. BARCLAY.
SEED DRILL.
No. 466,762. Patented Jan. 12, 1892.
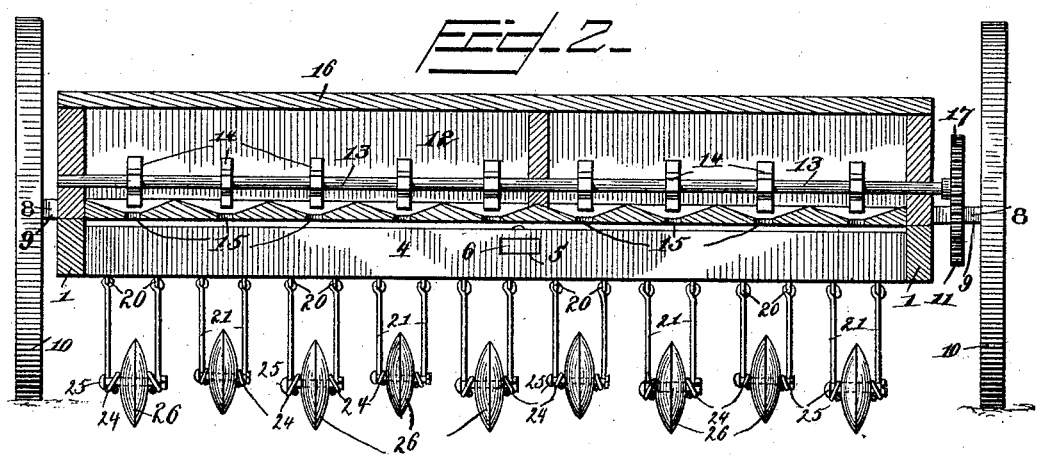
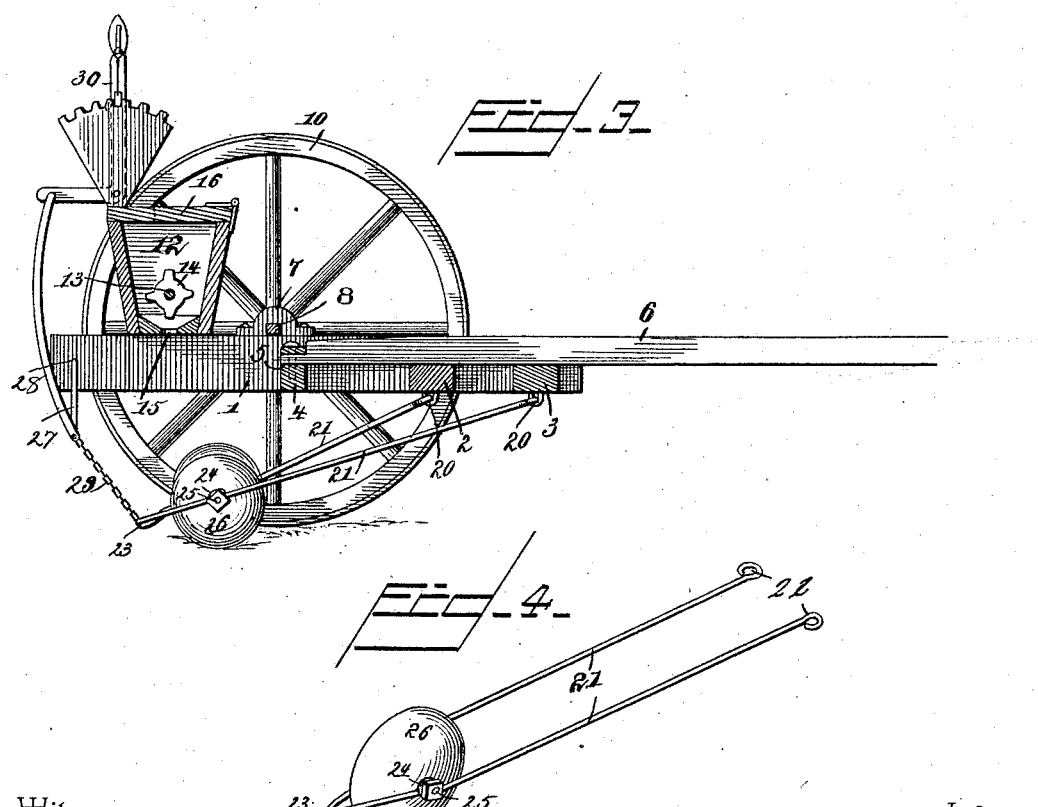
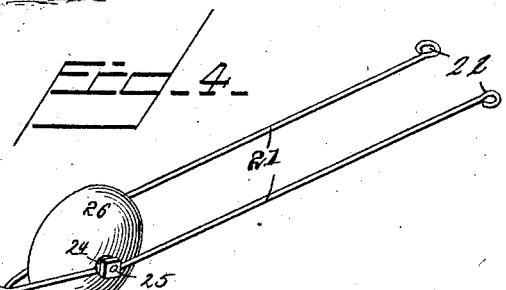
Witnesses:
H. G. Dieterich
W. S. Duvall
Inventor
Elmer E. Barclay
By his Attorneys,
C. A. Snow & Co.

UNITED STATES PATENT OFFICE.

ELMER ELLSWORTH BARCLAY, OF LAWRENCE, MICHIGAN.

SEED-DRILL.

SPECIFICATION forming part of Letters Patent No. 466,762, dated January 12, 1892.

Application filed January 31, 1891. Serial No. 379,832. (No model.)

*To all whom it may concern:*

Be it known that I, ELMER ELLSWORTH BARCLAY, a citizen of the United States, residing at Lawrence, in the county of Van Buren and State of Michigan, have invented a new and useful Seed-Drill, of which the following is a specification.

This invention relates to seeders; and the objects in view are to provide a cheap and simple machine for drilling and planting wheat, which machine is so constructed as to be readily thrown into and out of operation, and hence may be transported to and from the point of operation, and also plants in a direct line regardless of whether or not the ground is rolling or level.

Other objects and advantages of the invention will hereinafter appear, and the novel features thereof will be particularly pointed out in the claim.

Referring to the drawings, Figure 1 is a perspective of a seed-drill constructed in accordance with my invention. Fig. 2 is a transverse section. Fig. 3 is a longitudinal section. Fig. 4 is a detail in perspective of one of the circular drills and its connection.

Like numerals indicate like parts in all the figures of the drawings.

1 designates the opposite side bars of the frame-work, which latter are connected near their front ends by a pair of parallel bars 2 and 3, the latter disposed in front of the former. In rear of the cross-bar 2 is a transverse draft-beam 4, having a central socket 5, in which is located and connected the rear end of a draft-pole 6, to which may be attached the team. Opposite the ends of the draft-beam 4, which occur a short distance in rear of the center of the side bars 1, there is located upon said side bars opposite journal boxes or bearings 7, in which is journaled a transverse shaft or axle 8, the ends of which extend beyond the bearings and are squared, as at 9, to receive ground-wheels 10. Inside of one of the ground-wheels 10 and adjacent to the side bar 1 there is mounted upon the axle 8 a gear-wheel 11. Mounted upon the side bars 1 in rear of the axle 8 is the transversely-disposed hopper 12, subdivided by a central partition into two seed-compartments, through each of which passes a longitudinally-disposed agitator-shaft 13, provided at intervals with stirrers 14, each of which is arranged over a countersunk seed-opening 15, formed in the bottom of the hopper, said hopper being closed by a superimposed cover or lid 16, suitably hinged to the wall of the hopper. One end of the shaft 13 extends beyond the end wall of the hopper and there carries a gear-wheel 17, which is engaged and driven by the gear-wheel 11, heretofore mentioned. By the rotations of the ground-wheels 10, the axle 8, and the gear 11 motion is imparted to the gear 17, its shaft 13, and the series of stirrers or agitators 14, and thus seed is fed from the hopper through the seed-openings to the ground.

At intervals the transverse bars 2 and 3 alternately are provided with pairs of depending eyebolts 20, and in each pair of eyebolts are hooked or coupled the terminals of substantially U-shaped disk-carrying frames 21. Each disk-carrying frame 21 consists of its opposite terminals 22, is provided at its rear central portion with an eye 23, and at each side of the eye and opposite each other with bearing-openings 24, through which are passed short bearing shafts or pins 25, each of which serves as a bearing for a drill-disk 26. These drill-disks 26 are provided with opposite convexed sides and terminate in a sharp cutting-periphery, and the disk and frame, thus described, are located under and slightly in advance of each of the seed-openings in the bottom of the hopper, so that the seed are dropped in the furrows or drills formed by the drill-disks, the operation of which will be readily understood. It will be observed that by thus loosely connecting the disk-frames at their front ends the disks will, when meeting obstructions, be permitted to ride over the same, and thus avoid increasing the draft of the machine and the danger of injury to the disks.

The rear ends of the side bars 1 extend a short distance beyond the rear side of the hopper and have journaled therein a cranked shaft 27, the ends of the shaft terminating in suitable bearings 28, formed in the inner faces and near the ends of the side bars. At intervals the cranked portion of the shaft 27 has connected thereto the upper ends of a series of short chains 29, the lower ends of the chains each being connected to the eye 23 at the rear end of a correspondingly-opposite disk-supporting frame 21. By means of a lever 30 the crank-shaft may be swung up, and with it the entire series of disks or drills, the latter thus being supported clear of the ground, whereby the machine may be readily transported to and from the field without danger of breaking or otherwise injuring the drills by contact with stones, &c., lying in the road.

Having described my invention, what I claim is—

The combination, with the frame-work comprising the front and rear bars 2 and 3, each provided with a series of pairs of depending eyebolts, the eyebolts of one bar alternating with those of the other, of the U-shaped frames terminating at their front ends in eyes loosely coupled with the eye-bolts and provided at their rear ends with eyes and at each side of the same with bearings, short bearing-shafts arranged in the bearings, disk-shaped drills mounted on the shafts, the crank-shaft 27, the lever for operating the same, and the short chains leading from the crank-shaft to the eyes at the rear ends of the frames, substantially as specified.

In testimony that I claim the foregoing as my own I have hereto affixed my signature in presence of two witnesses.

ELMER ELLSWORTH BARCLAY.

Witnesses:
ZACHARIAH FISHER,
JOHN MICHAEL.